Oct. 25, 1955 R. EWALDS 2,721,643
LOADING MACHINE FOR MINERALS AND OTHER MINED PRODUCTS
Filed Sept. 28, 1950 5 Sheets-Sheet 1

INVENTOR:
ROBERT EWALDS
BY:

Oct. 25, 1955  R. EWALDS  2,721,643
LOADING MACHINE FOR MINERALS AND OTHER MINED PRODUCTS
Filed Sept. 28, 1950  5 Sheets-Sheet 2

INVENTOR:
ROBERT EWALDS
BY:

Oct. 25, 1955 R. EWALDS 2,721,643
LOADING MACHINE FOR MINERALS AND OTHER MINED PRODUCTS
Filed Sept. 28, 1950 5 Sheets-Sheet 3
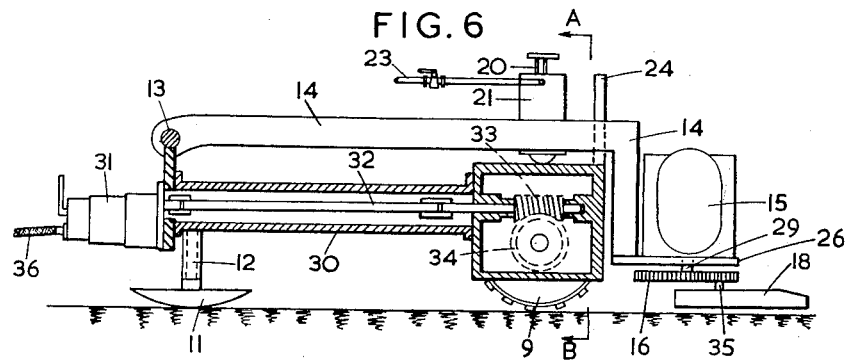
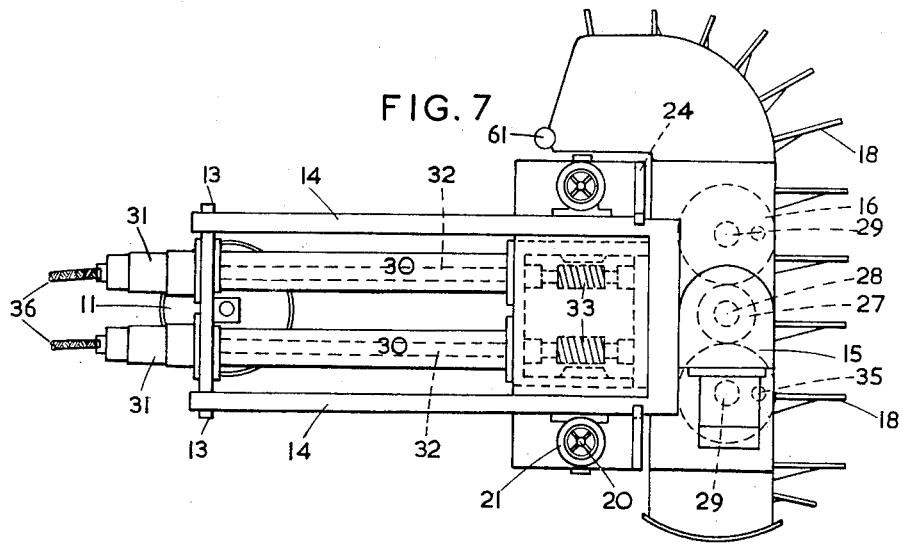
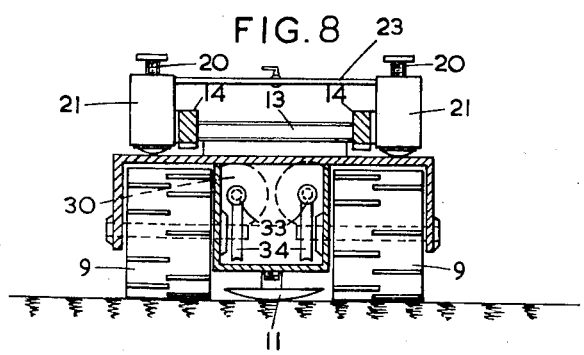
INVENTOR:
ROBERT EWALDS
BY:

Oct. 25, 1955 R. EWALDS 2,721,643
LOADING MACHINE FOR MINERALS AND OTHER MINED PRODUCTS
Filed Sept. 28, 1950 5 Sheets-Sheet 4
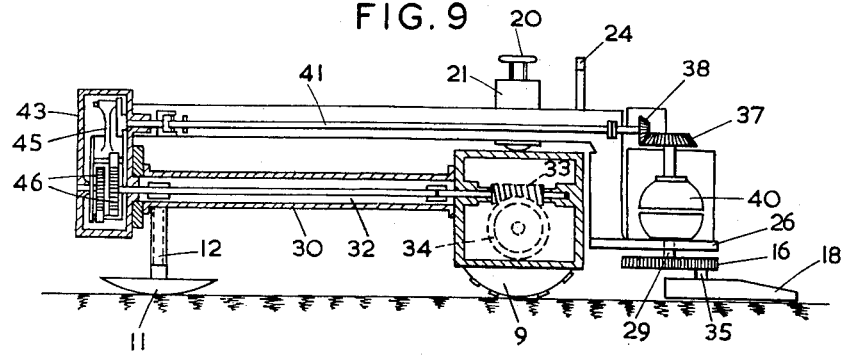
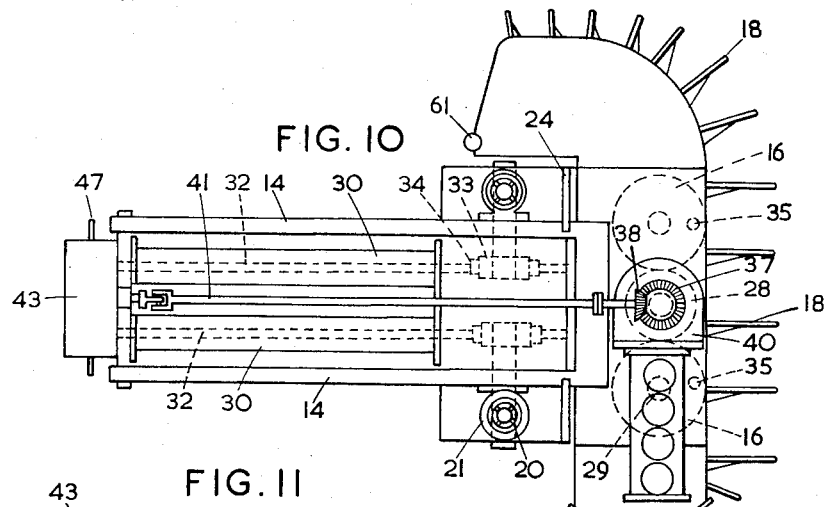
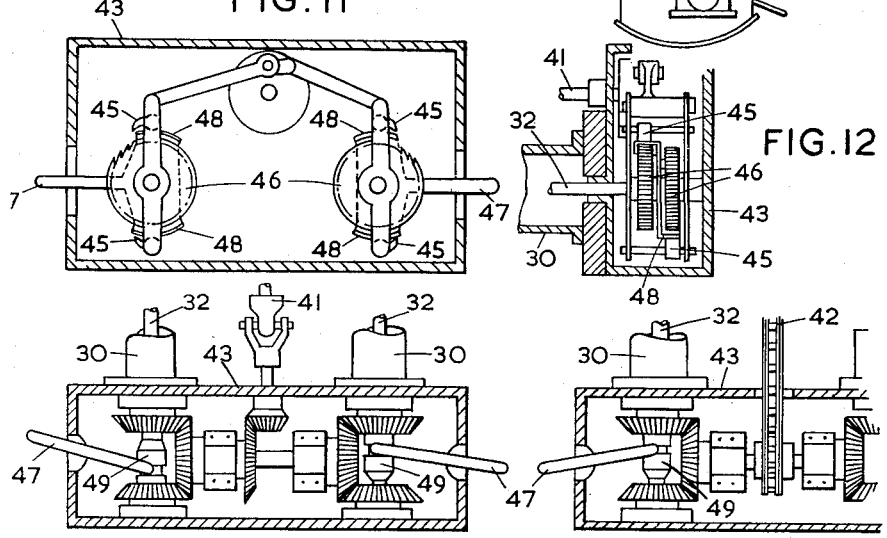
INVENTOR:
ROBERT EWALDS
BY:

Oct. 25, 1955 R. EWALDS 2,721,643
LOADING MACHINE FOR MINERALS AND OTHER MINED PRODUCTS
Filed Sept. 28, 1950 5 Sheets-Sheet 5
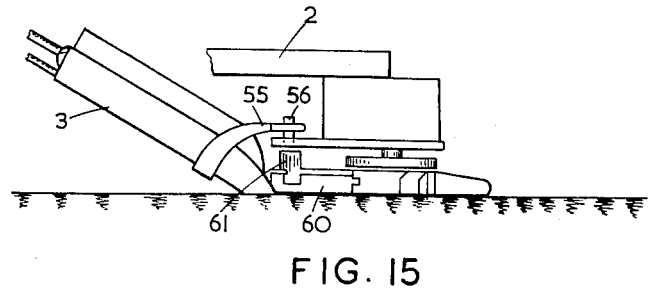
FIG. 15
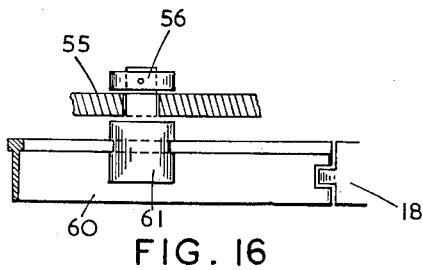
FIG. 16
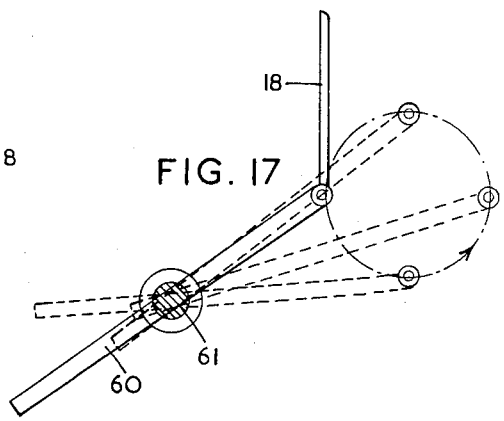
FIG. 17
FIG. 18
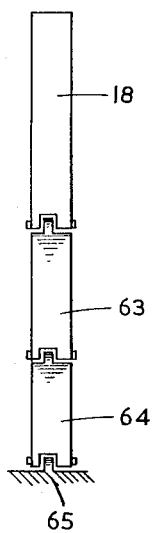
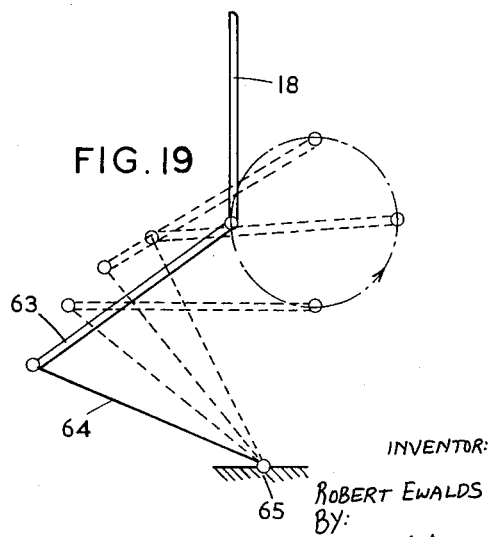
FIG. 19
INVENTOR:
ROBERT EWALDS
BY:

United States Patent Office 2,721,643
Patented Oct. 25, 1955

2,721,643

LOADING MACHINE FOR MINERALS AND OTHER MINED PRODUCTS

Robert Ewalds, Duisburg, Germany, assignor to Demag Aktiengesellschaft, Duisberg, Germany, a joint-stock company of Germany Application September 28, 1950, Serial No. 187,271

Claims priority, application Germany October 1, 1949

3 Claims. (Cl. 198—8)

The invention relates to a loading machine for mined minerals, which is particularly adapted for use in underground mining.

The invention has among its objects to provide a loading machine which is of relatively light and simple construction, easy to manipulate into and out of operative positions and effective to move cleanly all sizes of mined material from large blocks to fine dust.

Further objects of the invention are made clear in the ensuing description and claims.

The machine according to the invention is diagrammatically illustrated by way of example in the accompanying drawings, in which Figure 1 shows the general arrangement, Figure 2 is a side elevation of the machine, Figure 2a is a side elevation of the machine using endless tracks instead of wheels, Figure 3 is a side elevation on an enlarged scale of part of the machine showing a modification of the means for height adjustment, shown in Figure 2, Figure 4 is a plan view corresponding to Figure 2, Figure 5 is a similar view to Figure 4 at a later position of the stroke of the rake, Figure 6 is a sectional side elevation of a modified construction, Figure 7 is a corresponding plan, Figure 8 is a transverse sectional elevation on the line A—B of Figure 6, Figure 9 shows in part sectional elevation a modified construction using a single motor, Figure 10 is a corresponding plan, Figures 11 and 12 are detail sectional elevations of the construction illustrated in Figures 9 and 10.

Figures 13 and 14 are sectional elevations of the reversing gears,

Figures 15 to 19 are detail views of the parts by which the loading machine is connected to the conveyor, Figures 18 and 19 showing a modified construction of the pivoting movements.

Figure 1:
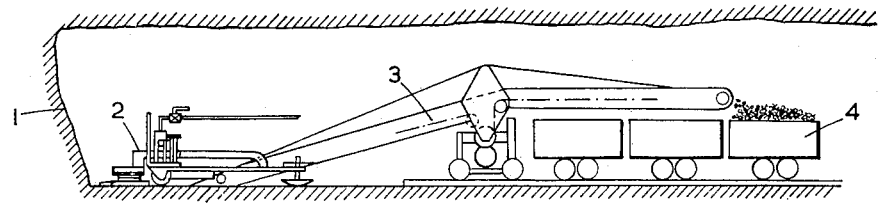

Referring to Figure 1 showing a general arrangement, the rock or the like 1 has been loosened by blast operations in mining. The mined material is transported by the loading machine 2 to the conveyor 3 whence it is transported by the conveyor into wagons 4.

Figure 2:
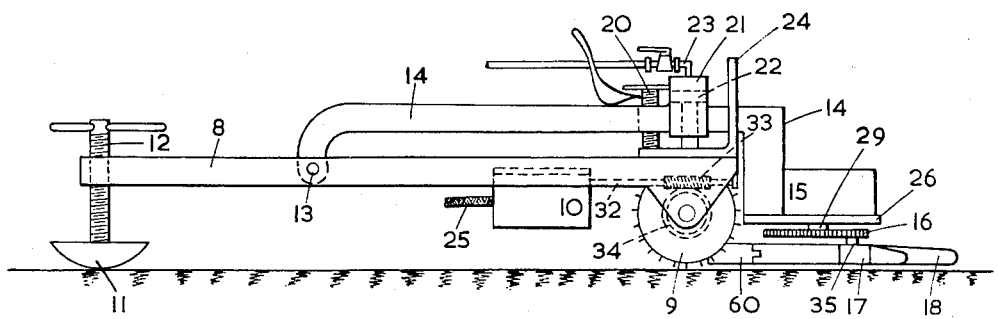
Figure 2A:
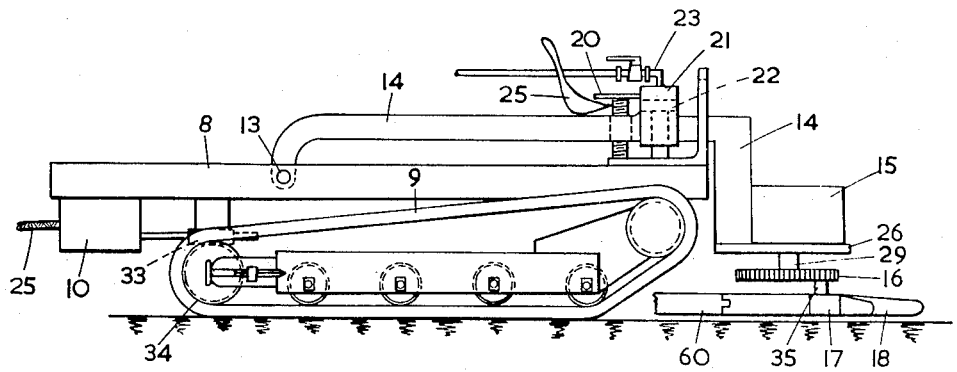
Figure 3:
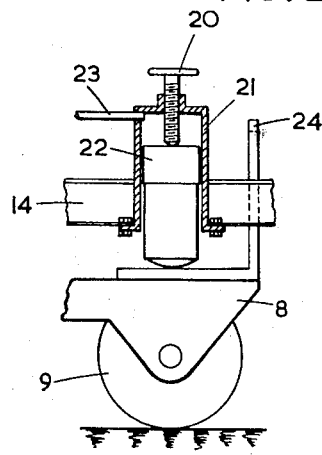
Figure 4:
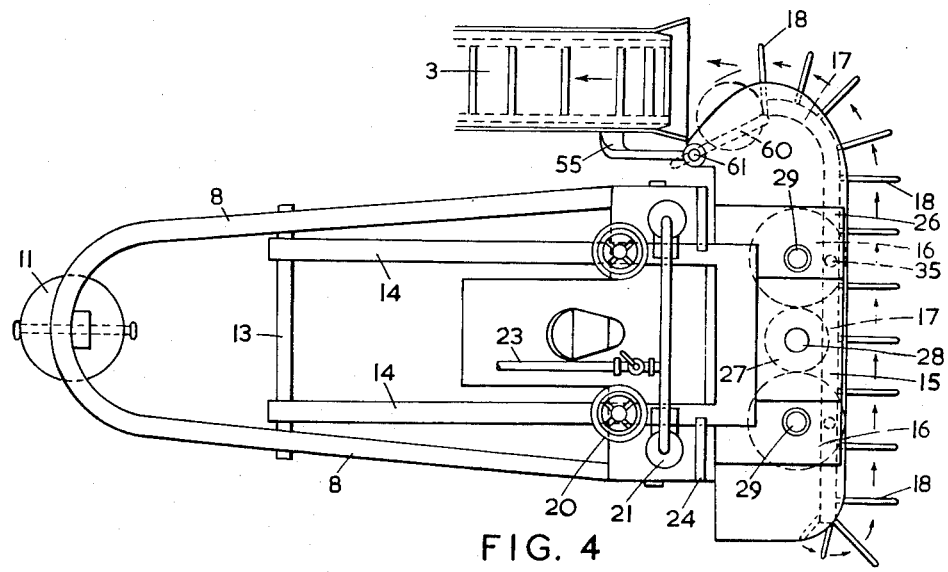
Figure 5:
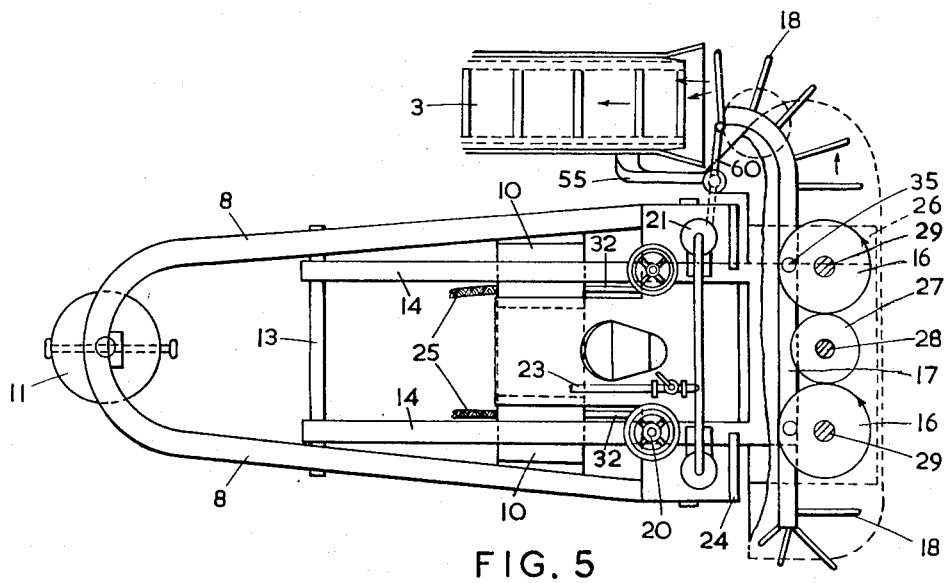

Referring to Figures 2 and 3, a chassis 8 is mounted on two wheels or rollers 9. The wheels or rollers 9 are driven independently of each other by driving motors 10, through worm gears 33, 34 and driving shafts 32, the motors 10 being supplied with a source of power through flexible cables 25.

The independent drive of the wheels or rollers 9 enables the loading machine to be steered round corners and from one side to the other. On the rear end of the chassis 8 a slide shoe 11 is provided which can be adjusted in height by means of a screw spindle 12. Instead of the carrying rollers 9 a Caterpillar or endless track drive can also be used: such drive would render the slide shoe 11 superfluous. A Caterpillar or endless track drive is particularly advantageous if the ground is soft, as in such case carrying rollers tend to sink into the ground.

On the chassis 8 a resilient carrier device is pivotally mounted at 13. The carrier device consists of bearer members 14 extending over and in front of the chassis 8, and being bent downwardly at the front, and of the loading machine. Horizontally mounted on the front end of the bearer members 14 is a support or platform 26 which carries a drive motor 15. A gear wheel 27 is mounted at the lower end of the downwardly extending drive shaft 28 of the motor 15. The gear wheel 27 drives two horizontally disposed crank gears 16 which are mounted on stub-shafts 29 supported on the underside of the support or platform 26. Secured on the crank-gears 16 by means of stub-shafts 35 is a rake 17 which is disposed in such manner that the position of the conveyor arms 18 lies horizontally above or at ground level. The height of the arms 18 may be adjusted by lifting or lowering the bearer members 14. For this purpose two means of height-adjustment are provided. The one consists of screw spindles 20 screw threaded in the bearer arms 14 the spindle 20 bearing against the chassis 8 and serving for fine-adjustment of the height. The second device for height-adjustment is constructed as a speed-stroke piston device and consists of cylinders 21 and co-operating pistons 22 between the bearer members 14 and chassis 8, and a pipe 23 for the pressure medium. 24 is a stop for limiting the stroke. During the loading operation the fine adjustment is effected through the spindles 20 which adjusts the heights of the conveyor arms 18 to the uneven levels. If, however, a quick and considerable adjustment in height is required, the piston device 21, 22, 23 is operated. This is particularly useful when the loading machine is being moved to another working position. As Figure 3 shows, both height adjustment devices can be combined by providing the spindles 20 in the cylinders 21 to bear on the heads of the pistons 22.

At the beginning of loading the machine is driven by the motors 10 up to the mined material at 1, and at the same time starts operating the horizontal crank gear 16 through the drive motor 15. The arms 18 thus dig periodically into the mined material and remove it laterally in a horizontal direction; the mined material is thus shifted in the direction of the rake 17, that is, first laterally and then rearwardly, until it comes into the range of the conveyor 3 positioned with the forward part at one side of the machine to receive the material which transports it into the wagons 4.

In the construction according to Figures 6, 7 and 8, the chassis consists of tubes 30. Driving motors 31 which are connected to a source of supply through cables 36, are provided to drive the wheels or rollers 9 independently of each other and are secured at the end of the tubes 30. The driving power is transmitted through Cardan shafts 32, or by similar mechanical means disposed in the tubes 30, and worm gear 33, 34 upon the carrying rollers 9. This arrangement is particularly advantageous if compressor motors are used. The means for operating the rake 17 and the adjustment of the bearer arms 14 are substantially the same as described with reference to Figures 2 to 5.

It is, however, also possible to drive the driving gear and the conveyor rake by a single motor. Examples of this are shown in Figures 9 to 14, the common motor being indicated by the reference 40. The motor 40 which drives the conveyor arms 18 as hereinafter described is also having connected, through gears 37 and 38 and a Cardan shaft 41 or a chain 42, to a gear box 43 at the rear end of the chassis. In the gear box 43 are provided, as illustrated in Figures 11 and 12, pawl and ratchet drives 45 operating ratchet wheels 46. From the ratchet wheels 46 the drive is transmitted to the carrying rollers 9 as in the construction of Figures 6, 7 and 8. Steering levers 47 operate steering shields 48. In the middle position of the steering shields 48 the ratchets are out of engagement with the ratchet wheels 46. According to the degree and the direction of the movement of the steering shields 48, the ratchet wheels 46 are driven by the motor 40 through the ratchet drive 45, and thus driving the carrying rollers 9.

In the construction according to Figures 13 and 14 gears 49 are used in order to enable the gear to be changed from neutral, to forward or to reverse.

Figures 15 to 19 show the connection between the loading machine 2 and the conveyor 3. The conveyor 3 carries near its lower end on one side a coupling arm 55 which engages on a securing bolt 56 of the loading machine 2. The conveyor 3 is thus so connected with the loading machine that the loading machine with its forward or backward movement takes the conveyor with it, being, however, capable of effecting rotational and swinging movements without the position of the conveyor being considerably altered. The loading machine and the conveyor can however be disconnected.

Between the loading machine 2 and conveyor 3 a metal sheet or strip is provided as a guide so that the mined material is transported safely to the conveyor while preventing any stoppage in the flow of the material. As illustrated in Figures 15 to 17, the metal sheet or strip consists of a sliding and swinging part 60 pivotally connected, for example near the last arm 18 of the rake, to the rake 17 and guided in the slide 61 so that the space between the last arm 18 and the conveyor 3 is laterally covered at the side facing the loading machine and the mined material is safely brought to the conveyor. By its swing movements the sliding and swinging part 60 assists in conducting the material to the conveyor 3.

In Figures 18 and 19 a pivoted swing member instead of a slide-swing member 60 is shown, consisting of the parts 63 and 64 which are pivotally connected together. The parts 63 and 64 are thus again pivotally connected to the conveyor rake 17 or to the last conveyor arm 18 of the rake, and at 65 are pivotally connected to the coupling arm 55, or to a part of the loading machine.

I claim:

1. A loading machine for material such as minerals and similar mining products, comprising, in combination, a carriage; a rake having a first portion extending transversely across an end of said carriage and a second portion located at an end of said first portion and extending at a substantial angle to said first portion; crank means mounted on said carriage and being operatively connected to said rake for moving the latter in one direction along a closed path having transverse and longitudinal components respectively extending transversely and longitudinally with respect to said carriage so that said first portion of said rake moves transversely across said carriage during movement of said rake along said transverse component of said path to move material across said carriage and so that said second portion of said rake moves longitudinally with respect to said carriage during movement of said rake along said longitudinal component of said path to move material transported by said first portion of said rake longitudinally with respect to said carriage and receiving means located adjacent said second portion of said rake to receive material therefrom.

2. A loading machine for material such as minerals and similar mining products, comprising, in combination, a carriage; a rake having a first portion extending transversely across an end of said carriage and a second portion located at an end of said first portion and extending at a substantial angle to said first portion, said first portion of said rake having teeth located at a predetermined distance from each other and extending away from said carriage and said second portion of said rake also having teeth spaced at a predetermined distance from each other and extending away from said carriage; crank means mounted on said carriage and being operatively connected to said rake for moving the latter in one direction along a closed path having transverse and longitudinal components respectively extending transversely and longitudinally with respect to said carriage so that said first portion of said rake moves transversely across said carriage during movement of said rake along said transverse component of said path to move material across said carriage and so that said second portion of said rake moves longitudinally with respect to said carriage during movement of said rake along said longitudinal component of said path to move material transported by said first portion of said rake longitudinally with respect to said carriage; and receiving means located adjacent said second portion of said rake to receive material therefrom.

3. A loading machine for material such as minerals and similar mining products, comprising, in combination, a carriage; a rake having a first portion extending transversely across an end of said carriage and a second portion located at an end of said first portion and extending at a substantial angle to said first portion, said first portion of said rake having teeth located at a predetermined distance from each other and extending away from said carriage and said second portion of said rake also having teeth spaced at a predetermined distance from each other and extending away from said carriage; crank means mounted on said carriage and being operatively connected to said rake for moving the latter in one direction along a closed path having transverse and longitudinal components which are respectively substantially greater than the predetermined distance between the teeth of said first portion of said rake and the predetermined distance between the teeth of said second portion of said rake, said transverse and longitudinal components of said path respectively extending transversely and longitudinally with respect to said carriage so that said first portion of said rake moves transversely across said carriage during movement of said rake along said transverse component of said path to move material across said carriage and so that said second portion of said rake moves longitudinally with respect to said carriage during movement of said rake along said longitudinal component of said path to move material transported by said first portion of said rake longitudinally with respect to said carriage; and receiving means located adjacent said second portion of said rake to receive material therefrom.

References Cited in the file of this patent

UNITED STATES PATENTS

| | | |
|---|---|---|
| 1,364,903 | Thomas | Jan. 11, 1921 |
| 1,445,332 | London | Feb. 13, 1923 |
| 1,791,662 | Davis | Feb. 10, 1931 |
| 1,848,532 | Lang | Mar. 8, 1932 |
| 1,997,589 | Levin | Apr. 16, 1935 |
| 2,099,981 | Joy | Nov. 23, 1937 |
| 2,135,773 | Sheppard | Nov. 8, 1938 |
| 2,298,448 | Arentzen | Oct. 13, 1942 |
| 2,360,282 | Russell | Oct. 10, 1944 |
| 2,399,713 | Tibbals | May 7, 1946 |

FOREIGN PATENTS

| | | |
|---|---|---|
| 312,864 | Germany | June 19, 1919 |
| 573,962 | Great Britain | Dec. 14, 1945 |